United States Patent
Heo et al.

(10) Patent No.: US 9,055,474 B2
(45) Date of Patent: Jun. 9, 2015

(54) APPARATUS FOR IMPROVED MOBILITY IN A WIRELESS HETEROGENEOUS NETWORK

(71) Applicant: Intel Corporation, Santa Clara, CA (US)

(72) Inventors: Youn Hyoung Heo, Seoul (KR); Yujian Zhang, Beijing (CN); Mo-Han Fong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 13/705,624

(22) Filed: Dec. 5, 2012

(65) Prior Publication Data

US 2013/0273878 A1 Oct. 17, 2013

Related U.S. Application Data

(60) Provisional application No. 61/624,185, filed on Apr. 13, 2012.

(51) Int. Cl.
*H04W 36/00* (2009.01)
*H04W 28/08* (2009.01)
(Continued)

(52) U.S. Cl.
CPC .............. *H04W 28/08* (2013.01); *H04W 28/02* (2013.01); *H04L 5/0001* (2013.01);
(Continued)

(58) Field of Classification Search
CPC ... H04W 36/08; H04W 36/0016; H04W 4/10; H04W 36/0083; H04W 84/045; H04W 24/02; H04W 28/08; H04W 36/14; H04W 36/30; H04W 48/18; H04W 64/00; H04W 72/04; H04W 72/042; H04W 76/028; H04W 7/0406; H04W 88/06

USPC ........... 455/434, 436–444, 501; 370/328–333
See application file for complete search history.

(56) References Cited

U.S. PATENT DOCUMENTS 8,355,367 B2 * 1/2013 Han et al. ...................... 370/328
8,744,449 B2 * 6/2014 Song et al. .................... 455/437
(Continued)

FOREIGN PATENT DOCUMENTS

| EP | 2224770 A1 | 9/2010 |
|---|---|---|
| WO | 2011/099910 A1 | 8/2011 |
| WO | 2012-047144 | 4/2012 |

OTHER PUBLICATIONS

International Search Report and Written Opinion received for PCT application No. PCT/US2013/036445, mailed on Jul. 26, 2013, 12 Pages.

(Continued)

*Primary Examiner* — Olumide T Ajibade Akonai
(74) *Attorney, Agent, or Firm* — Grossman, Tucker, Perreault & Pfleger, PLLC

(57) ABSTRACT

Generally, this disclosure provides apparatus and methods for improved User Equipment (UE) mobility in wireless heterogeneous networks. The UE device may include a location determination module configured to determine location information associated with the UE relative to one or more of a cells, wherein the of cells form part of a wireless heterogeneous network; a processing circuit configured to generate an assistance message, the assistance message including the location information associated with the UE; and a transmitter circuit configured to transmit a Radio Resource Control (RRC) message to an evolved Node B (eNB) associated with one of the cells, the RRC message including the assistance message.

6 Claims, 11 Drawing Sheets

(51) Int. Cl.
*H04W 28/02* (2009.01)
*H04L 5/00* (2006.01)
*H04W 72/04* (2009.01)
*H04W 74/08* (2009.01)
*H04W 36/08* (2009.01)
*H04W 24/02* (2009.01)
*H04W 76/02* (2009.01)
*H04W 24/10* (2009.01)

(52) U.S. Cl.
CPC ......... *H04W 76/028* (2013.01); *H04W 72/042* (2013.01); *H04W 72/04* (2013.01); *H04W 74/0808* (2013.01); *H04W 24/10* (2013.01); *H04W 36/08* (2013.01); *H04W 76/023* (2013.01); *H04W 24/02* (2013.01); *H04W 36/0016* (2013.01); *Y02B 60/50* (2013.01)

(56) References Cited

U.S. PATENT DOCUMENTS

| | | | |
|---|---|---|---|
| 8,811,314 B2* | 8/2014 | Noh et al. | 370/329 |
| 8,824,384 B2* | 9/2014 | Nam et al. | 370/329 |
| 2008/0108374 A1 | 5/2008 | Xiong et al. | |
| 2011/0201332 A1 | 8/2011 | Siomina et al. | |
| 2011/0256861 A1 | 10/2011 | Yoo et al. | |
| 2012/0236741 A1* | 9/2012 | Xu et al. | 370/252 |
| 2013/0189971 A1* | 7/2013 | Callender et al. | 455/423 |

OTHER PUBLICATIONS

Ericsson et al., "Aspects on Distributed RRUs with Shared Cell-ID for Heterogeneous Deployments", 3GPP TSG-RAN WG1 #64, R1-110649, Taipei, Taiwan, Feb. 21-25, 2011, 11 Pages.

International Preliminary Report on Patentability / with Written Opinion received for PCT Application No. PCT/US2013/036445 mailed on Oct. 23, 2014.

Huawei: "UE measurement method", 3GPP Draft; R3-120577 UE Measurement Method, 3rd Generation Partnership Project (3GPP), Mobile Competence Centre; 650, Route Des Lucioles, F-06921 Sophia-Antipolis Cedex; France, Technical Fields vol. RAN WG3, No. San Jose del Cabo, Searched (IPC) Mexico; 20120326-20120330, Mar. 16, 2012.

Renesas Mobile Europe Ltd: IOCR for 1-15 excluding handover from mobility state estimation, 3GPP Draft; R2-116098 CR Exclude HO from MSE, 3rd Generation Partnership Project (3GPP), Mobile Competence Centre; 650, Route Des Lucioles, F-06921 Sophia-Antipolis Cedex; France, vol. RAN WG2, No. San Francisco, USA; 20111114-20111118, Nov. 7, 2011.

Extended European Search Report from related application EP 13776103 mailed Mar. 16, 2015.

* cited by examiner

400

405

```
CellsToAddMod ::= SEQUENCE {
    cellIndex INTEGER (1..maxCellMeas),
    physCellId PhysCellId,
    cellIndividualOffset Q-OffsetRange
    usage ENUMERATED {capacity, coverage} OPTIONAL    ← 410
}
```

415

```
MeasObjectEUTRA ::= SEQUENCE {
    carrierFreq ARFCN-ValueEUTRA,
    usage ENUMERATED {capacity, coverage} OPTIONAL    ← 420
    allowedMeasBandwidth AllowedMeasBandwidth,
    presenceAntennaPort1 PresenceAntennaPort1,
    neighCellConfig NeighCellConfig,
    offsetFreq Q-OffsetRange DEFAULT dB0,
    -- Cell list
    cellsToRemoveList CellIndexList OPTIONAL, -- Need ON
    cellsToAddModList CellsToAddModList OPTIONAL, -- Need ON
    -- Black list
    blackCellsToRemoveList CellIndexList OPTIONAL, -- Need ON
    blackCellsToAddModList BlackCellsToAddModList OPTIONAL, -- Need ON
    cellForWhichToReportCGI PhysCellId OPTIONAL, -- Need ON
    ...
    [[ measCycleSCell-r10 MeasCycleSCell-r10 OPTIONAL, -- Need ON
        measSubframePatternConfigNeigh-r10 MeasSubframePatternConfigNeigh-r10 OPTIONAL
        -- Need ON
    ]]
}
```

```
SystemInformationBlockType5 ::= SEQUENCE {
    interFreqCarrierFreqList InterFreqCarrierFreqList,
    .....
    lateNonCriticalExtension OCTET STRING OPTIONAL -- Need OP
}

InterFreqCarrierFreqList ::= SEQUENCE (SIZE (1..maxFreq)) OF InterFreqCarrierFreqInfo InterFreqCarrierFreqInfo ::= SEQUENCE {
    dl-CarrierFreq ARFCN-ValueEUTRA,
    q-RxLevMin Q-RxLevMin,
    p-Max P-Max OPTIONAL, -- Need OP
    t-ReselectionEUTRA T-Reselection,
    t-ReselectionEUTRA-SF SpeedStateScaleFactors OPTIONAL, -- Need OP
    threshX-High ReselectionThreshold,
    threshX-Low ReselectionThreshold,
    allowedMeasBandwidth AllowedMeasBandwidth,
    presenceAntennaPort1 PresenceAntennaPort1,
    cellReselectionPriority CellReselectionPriority OPTIONAL, -- Need OP
    neighCellConfig NeighCellConfig,
    q-OffsetFreq Q-OffsetRange DEFAULT dB0,
    interFreqNeighCellList InterFreqNeighCellList OPTIONAL, -- Need OR
    interFreqNeighSmallCellList InterFreqNeighSmallCellList OPTIONAL, -- Need OR
    interFreqBlackCellList InterFreqBlackCellList OPTIONAL, -- Need OR
    .....
    [[ q-QualMin-r9 Q-QualMin-r9 OPTIONAL, -- Need OP
       threshX-Q-r9 SEQUENCE {
           threshX-HighQ-r9 ReselectionThresholdQ-r9,
           threshX-LowQ-r9 ReselectionThresholdQ-r9
       } OPTIONAL -- Cond RSRQ
    ]]
}
```

510 →

```
interFreqNeighSmallCellList::= SEQUENCE (SIZE (1..maxCellInter)) OF interFreqNeighSmallCellInfo
interFreqNeighSmallCellInfo::= SEQUENCE {
    physCellId PhysCellId,
    q-OffsetCell Q-OffsetRange
    usage {capacity, coverage}
}
```

610 →
MeasConfig ::= SEQUENCE {
 -- Measurement objects
 measObjectToRemoveList MeasObjectToRemoveList OPTIONAL, -- Need ON
 measObjectToAddModList MeasObjectToAddModList OPTIONAL, -- Need ON
 -- Reporting configurations
 reportConfigToRemoveList ReportConfigToRemoveList OPTIONAL, -- Need ON
 reportConfigToAddModList ReportConfigToAddModList OPTIONAL, -- Need ON
 -- Measurement identities
 measIdToRemoveList MeasIdToRemoveList OPTIONAL, -- Need ON
 measIdToAddModList MeasIdToAddModList OPTIONAL, -- Need ON
 -- Other parameters
 quantityConfig QuantityConfig OPTIONAL, -- Need ON
 measGapConfig MeasGapConfig OPTIONAL, -- Need ON
 620 → s-Measure RSRP-Range OPTIONAL, -- Need ON
 630 → s-Measure-add RSRP-Range OPTIONAL, -- Need ON
 preRegistrationInfoHRPD PreRegistrationInfoHRPD OPTIONAL, -- Need OP
 speedStatePars CHOICE {
  release NULL,
  setup SEQUENCE {
   mobilityStateParameters MobilityStateParameters,
   timeToTrigger-SF SpeedStateScaleFactors
  }
 } OPTIONAL, -- Need ON
 ...
}

FIG. 6

APPARATUS FOR IMPROVED MOBILITY IN A WIRELESS HETEROGENEOUS NETWORK

CROSS-REFENCE TO RELATED APPLICATIONS

The present patent application is related to and claims priority to U.S. Provisional Patent Application Ser. No. 61/624,185, filed Apr. 13, 2012.

FIELD

The present disclosure relates to wireless heterogeneous networks, and more particularly, to apparatus and methods for improved User Equipment (UE) mobility in wireless heterogeneous networks.

BACKGROUND

Wireless networks, for example Long Term Evolution (LTE) and LTE-Advanced (LTE-A) networks, may be heterogeneous networks that include "macro cells," providing higher power/wider area coverage, and "small cells," providing lower power/reduced area coverage. Small cells may include "femto cells," suitable for home or office coverage and "pico cells," for larger indoor environments such as shopping centers. A base station, for example an evolved Node B (eNB) transceiver, may be associated with each cell to provide network access to wireless mobile devices, for example User Equipment (UEs), passing through that cell coverage area.

Small cells may be located within a macro cell coverage area. These small cells may be provided to offer additional capacity (e.g., to handle more UEs) or they may be provided to offer additional coverage (e.g., to fill in coverage holes or gaps in the macro cell coverage area).

As the UE travels through small cell coverage areas, cell handovers may be required which can result in network system and UE inefficiencies and other problems. These problems include increased detection and reporting of serving cell channel quality, increased UE power consumption, conflict and shortage of Cell IDs and excessive handover between cells with an increased risk of radio link failure.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 4 illustrates a data structure associated with one exemplary embodiment consistent with the present disclosure;

FIG. 5 illustrates a data structure associated with another exemplary embodiment consistent with the present disclosure;

FIG. 6 illustrates a data structure associated with another exemplary embodiment consistent with the present disclosure;

Although the following Detailed Description will proceed with reference being made to illustrative embodiments, many alternatives, modifications, and variations thereof will be apparent to those skilled in the art.

DETAILED DESCRIPTION

Generally, this disclosure provides apparatus and methods for improved User Equipment (UE) mobility in a wireless heterogeneous network, for example an LTE or LTE-A network that includes macro cells and small cells. The UE (e.g., the mobile device) may be configured with location circuitry enabling a determination of motion, for example exiting and entering, with respect to detected and identified cells. The UE may transmit this motion or proximity information to an evolved Node B (eNB) base station, and the information may assist the eNB with the performance of handovers of the UE from one cell to another. The eNB may be configured to maintain a database of neighboring cells and this database may include the "usage type" of each cell, where usage type indicates whether the cell is provided for capacity enhancement or coverage enhancement.

In some embodiments, the UE may be configured to perform signal measurements on neighbor cells when the Reference Signal Received Power (RSRP) of the serving cell falls below a threshold and the threshold may be based on the usage type of the neighboring cells. The UE may be further configured to report the signal measurements to the serving cell during a time period that is based on the usage type of the neighboring cells. In some embodiments, for example when multiple small cells transmit a Cell Specific Reference Signal (CRS) using the same Cell ID, the eNB may be configured to identify a subframe of the CRS on which the UE may perform the signal measurement. The above mentioned features may be provided to decrease the amount of time that the UE devotes to measuring signals and reporting the measurements, thus increasing efficiency UE and network efficiency.

Figure 1:
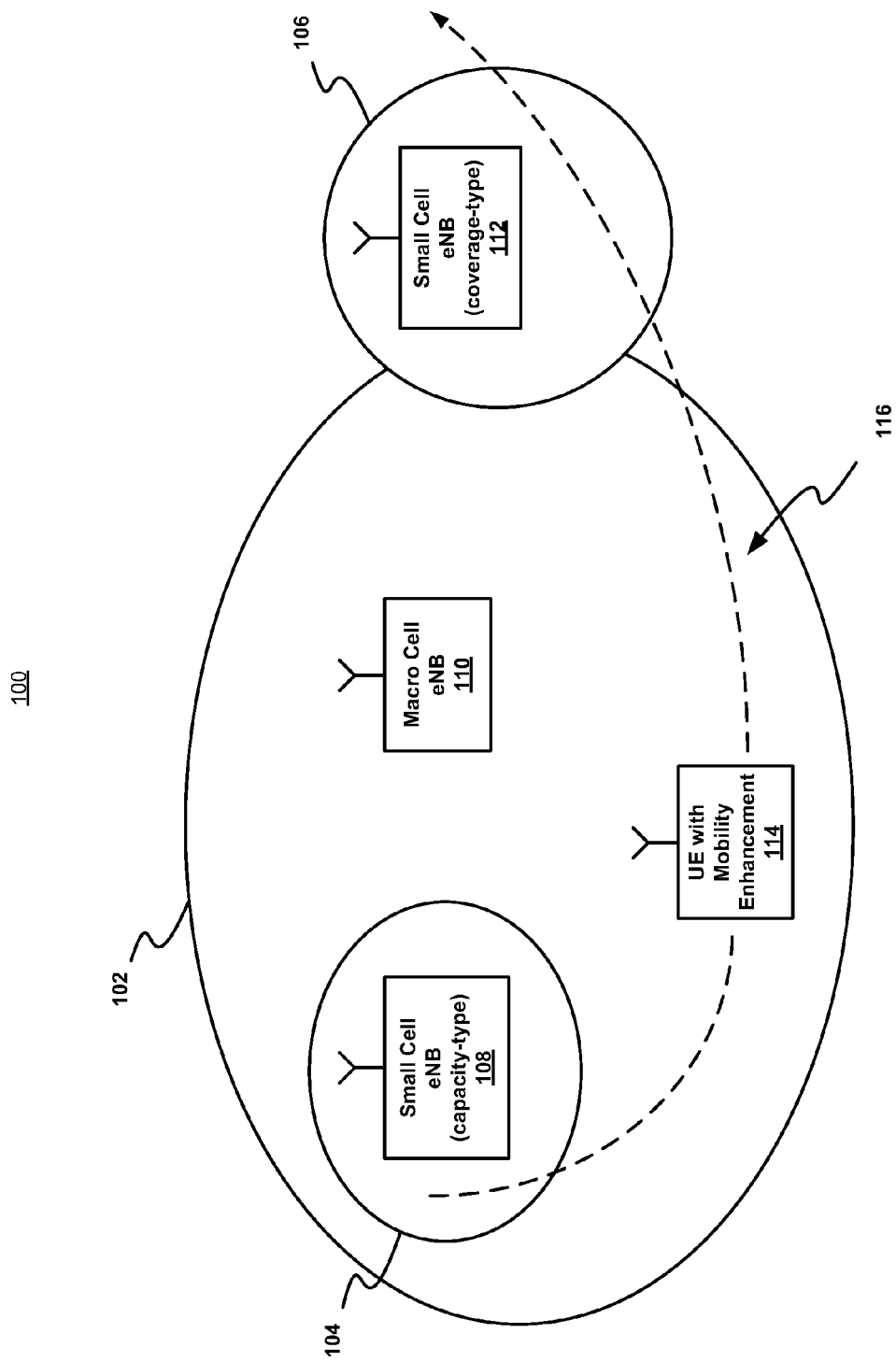
FIG. 1 illustrates a top level system diagram of one exemplary embodiment consistent with the present disclosure.

FIG. 1 illustrates a top level system diagram 100 of one exemplary embodiment consistent with the present disclosure. A heterogeneous wireless network 100 is shown in a simplified form to include a macro cell eNB 110, two small cell eNBs 108, 112 and a UE configured for mobility enhancement 114, as will be explained in greater detail below. The heterogeneous wireless network 100 may comply with, or otherwise be compatible with, the Third Generation Partnership Project (3GPP) Long Term Evolution (LTE) and/or LTE-Advanced (LTE-A) based wireless network standard, including current, previous and future versions of that standard.

Small cells may include, for example, pico cells and femto cells. The macro cell eNB 110 provides cell coverage area 102, while small cell eNB 108 provides cell coverage area 104 and small cell eNB 112 provides cell coverage area 106. UE 114 is shown to travel on a path 116 through each of the cell coverage areas which may result in handovers between eNBs.

Small cell eNB 108, of this example, is configured as a "capacity" usage type cell. That is to say, eNB 108 is provided to increase network capacity by handling additional UEs that may be offloaded from another eNB that is closer to maximum channel or resource capacity. In contrast, small cell eNB 112, of this example, is configured as a "coverage" usage type cell. That is to say, eNB 112 is provided to improve coverage by filling in coverage holes, or gaps, in the coverage area of the macro cell coverage area 102. Efficiency improvements associated with UE mobility may be obtained by employing this cell type usage information in connection with operations performed by the UE and the eNBs, as will be described below.

Figure 2:
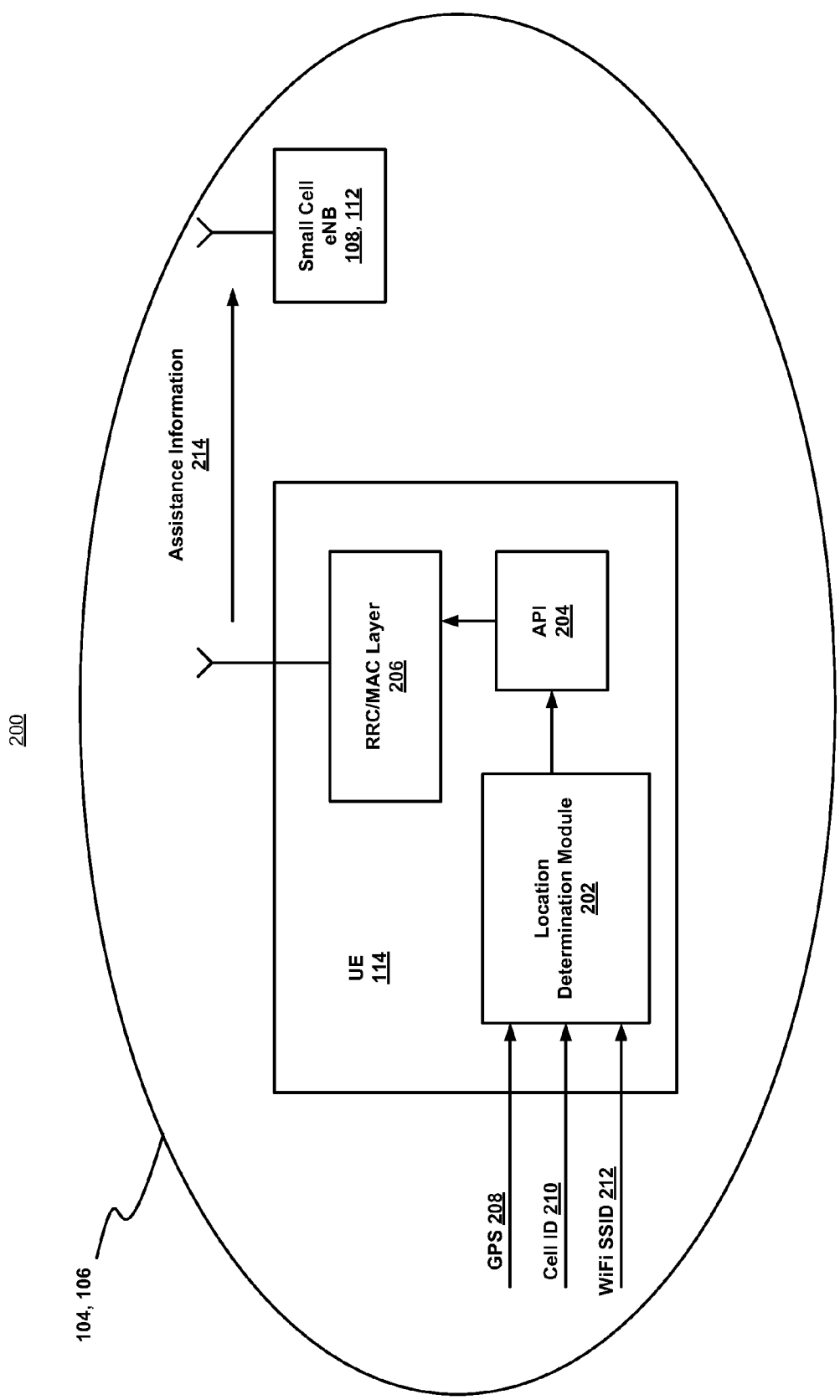
FIG. 2 illustrates a block diagram of one exemplary embodiment consistent with the present disclosure.

FIG. 2 illustrates a block diagram 200 of one exemplary embodiment consistent with the present disclosure. A UE 114 is shown located in a small cell coverage area 104, 106. The UE may include a location determination module 202 configured to estimate the location and/or motion of the UE and, in particular, whether the UE is exiting or entering a cell coverage area. In some embodiments, the location determination module 202 may base the estimation on information received from a global positioning system (GPS) signal or receiver 208. Location determination module 202 may additionally, or alternatively, base the estimation on a received cell ID 210 and/or a received WiFi Service Set Identifier (SSID) 212.

Some existing smartphone (UE) applications allow a user to customize phone behavior based on location. For example, a user may define, through such an application, certain areas associated with GPS locations, or linked to particular Cell IDs or WiFI SSIDs. These defined areas may be specified by the user as a particular type of area, such as an office area or a home area, which may be associated with a particular small cell. The location and exiting/entering information may be made available to the UE by the application software through an application programming interface (API) 204.

The Radio Resource Control (RRC)/Media Access Control (MAC) layer 206 of the UE controls the transmissions that are carried out by the air interface layer of the UE. The RRC/MAC layer 206 may be notified and provided with the location information from the API 204. The RRC/MAC layer 206 may then send an assistance information message 214 to the network (e.g., small cell eNB 108, 112, or macro cell eNB 110) which may use this information to perform network optimizations, for example the configuration of network parameters associated with mobility as will be described below.

The assistance information message 214 may include a number of fields. A type field may indicate whether the exiting or entering condition is satisfied. A small cell type field may indicate whether the small cell is an office cell or a home cell. Additional fields may indicate whether the serving cell is a preferred small cell as well as the preferred small cell carrier frequency and/or Physical Cell Identity (PCI). The assistance information message 214 may be incorporated into an existing Proximity Indication RRC message or may be implemented as a new type of RRC message.

Figure 3:
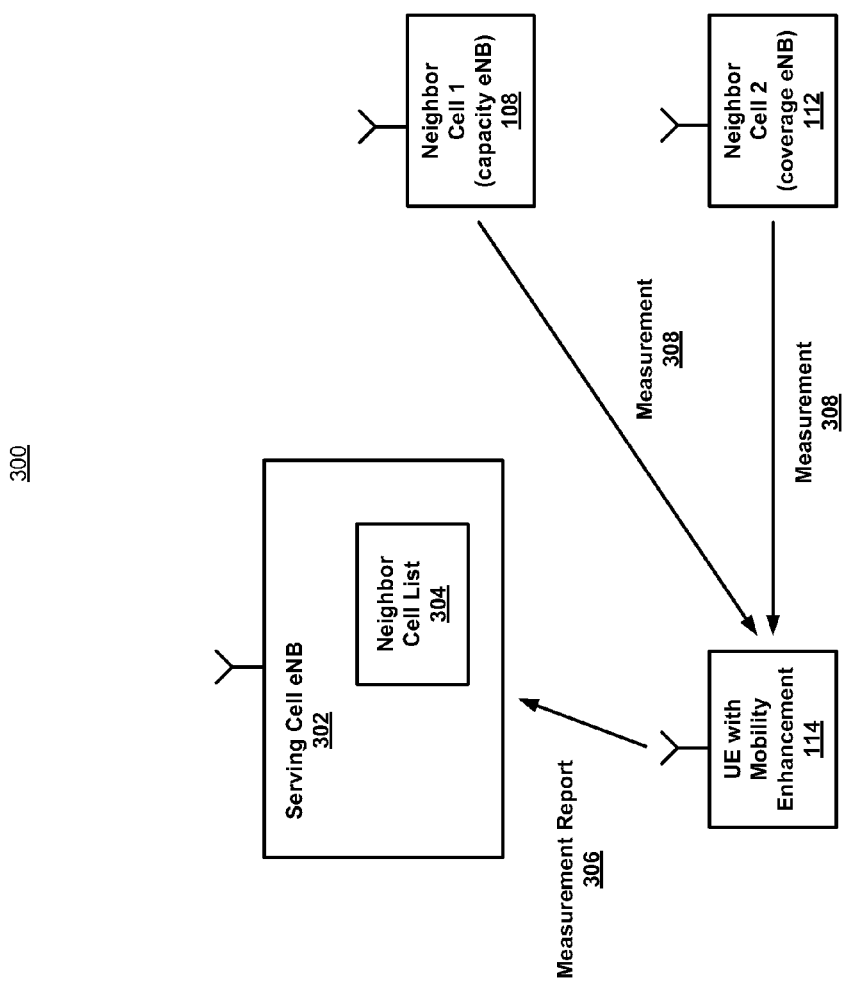
FIG. 3 illustrates a block diagram of another exemplary embodiment consistent with the present disclosure.

FIG. 3 illustrates a block diagram 300 of another exemplary embodiment consistent with the present disclosure. UE 114 may be configured to perform signal measurements 308 on neighbor cells 108, 112 and to report those measurements 306 to serving cell eNB 302 which is currently serving the UE 114. Signal measurements, for example of the RSRP from neighboring cells, are generally performed by the UE 114 to estimate the neighboring cell environment for possible switching of the UE to a new serving cell (e.g., handovers).

Serving cell eNB 302 is shown to maintain a neighbor cell list 304 which includes information about neighboring cells that assists the UE in performing neighbor cell signal measurements. This information may include the usage type of the neighbor cells (i.e., whether it is a capacity type cell or a coverage type cell). For example, if the neighboring cell is a coverage type cell, the UE may need to send signal measurement reports within a shorter time period, after a measurement report is triggered, to avoid radio link failure with the serving cell before a handover command is received from the serving cell. In the case of a capacity type cell, where coverage overlaps with the macro cell, radio link failure is less likely to occur so measurement reports may be less time critical.

FIGS. 4 through 7 illustrate data structures and/or message fields that may comply with, or otherwise be compatible with, the 3GPP LTE and/or LTE-A based wireless network standard, including current, previous and future versions of that standard.

FIG. 4 illustrates a data structure 400 associated with one exemplary embodiment consistent with the present disclosure. In an LTE or LTE-A system, the neighbor cell list 304 provides information related to one or more neighboring cells and the eNBs associated of those neighboring cells. This information may include carrier frequencies, bandwidths and other information that may be required for a handover of the UE 114 from a serving cell to a neighboring cell. The neighbor cell list 304 may be associated with an information element known as a "MeasObjectEutra" 415 which may be included as part of an RRC message. In this embodiment, a new information field, labeled "usage" 410, may be added to the CellsToAddMod data structure 405 which may be included for each cell that is specified in the MeasObjectEUTRA 415. The usage field 410 enables the eNB 302 to inform the UE 114 of the usage type (i.e., capacity, coverage or other futures usage types) of neighboring cells 108, 112. Alternatively, if all cells in a particular frequency carrier have the same usage type, the usage information may be included directly (e.g., at the top level) in the MeasObjectEUTRA 415 as a separate usage field 420 since MeasObjectEUTRA 415 is configured for each carrier frequency.

FIG. 5 illustrates a data structure 500 associated with another exemplary embodiment consistent with the present disclosure. An example LTE or LTE-A System Information Block (SIB) 5 is shown at 505. If a UE 114 is in idle mode, the neighboring cell list 304 with usage information may be provided in SIB-5 505 with the addition of an interFreqNeighSmallCellInfo data structure 520 that includes a usage field to indicate capacity type or coverage type for the specified neighboring cell. In some embodiments, the neighboring cell list 304 with usage information may be provided in System Information Block (SIB) 4, which is associated with intra-frequency measurements.

The UE 114 may be configured to advantageously adjust a number of LTE and LTE-A measurement related parameters based on the provided usage information that is specified for the neighboring cells 108, 112 as described above. These parameters may include, for example, s-Measure and timeToTrigger as will be described below.

The s-Measure parameter may control, at least in part, the measurement requirement associated with the UE performance of signal measurements on neighboring cells including intra-frequency, inter-frequency and inter-Radio Access Technology (RAT) measurements. The UE is generally required to perform these measurements when the RSRP from the serving cell falls below the specified s-Measure value, or in other words when the radio link between the UE and the serving cell may be decreasing in strength.

FIG. 6 illustrates an LTE or LTE-A MeasConfig data structure 610 that includes an existing s-Measure data field 620. In some embodiments, an additional s-Measure field, s-Measure-add 630, may be provided. The UE 114 may apply either s-Measure 620 or s-Measure-add 630 depending on the usage type of each neighbor cell. For example, if the usage of a neighboring cell is capacity type, the measurement of this cell may be performed if the serving cell RSRP is lower than s-Measure-add 630. If the usage of a neighboring cell is coverage type or the usage is not specified or configured, the measurement of this cell may be performed if the serving cell RSRP is lower than s-Measure 620. Alternatively, the usage can be provided for each frequency carrier. In this case, if the usage of a frequency carrier in the measurement object is capacity, the measurement of neighboring cells in the frequency carrier may be performed if the serving cell RSRP is lower than s-Measure-add 630. If the usage of a frequency carrier in the measurement object is coverage or the usage is not specified or configured, the measurement of neighboring cells in the frequency carrier may be performed if the serving cell RSRP is lower than s-Measure 620.

Figure 7:
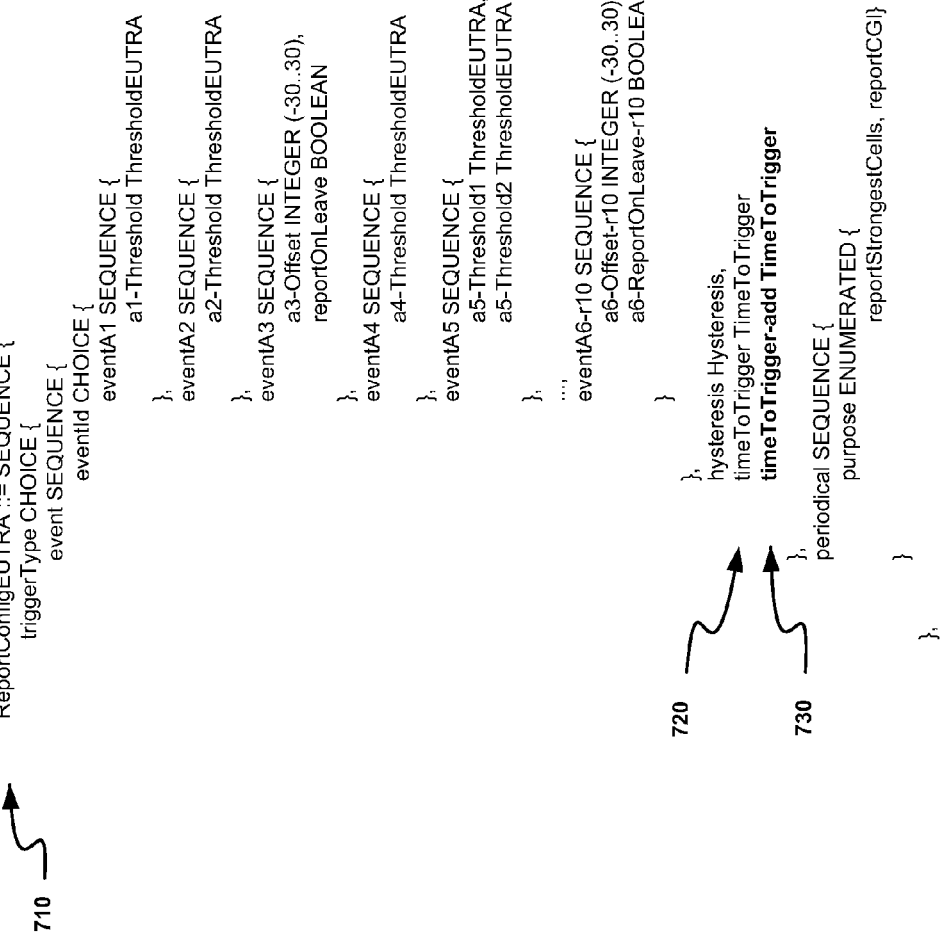
FIG. 7 illustrates a data structure associated with another exemplary embodiment consistent with the present disclosure.

The timeToTrigger parameter is provided to avoid frequent triggering of measurement reporting. FIG. 7 illustrates an LTE or LTE-A ReportConfigEUTRA data structure 710, which may be part of an RRC message, which includes an existing timeToTrigger data field 720. The timeToTrigger parameter defines a time duration during which the UE 114 may send the measurement report after a measurement reporting event occurs. In some embodiments, an additional timeToTrigger field, timeToTrigger-add 730, may be provided. For example, if the usage of a neighboring cell is capacity type, the timeToTrigger-add value may be used to determine whether the triggering condition is met. Otherwise, if the usage is coverage type or the usage is not specified or configured, the TimeToTrigger value may be used to determine whether the triggering condition is met.

Figure 8:
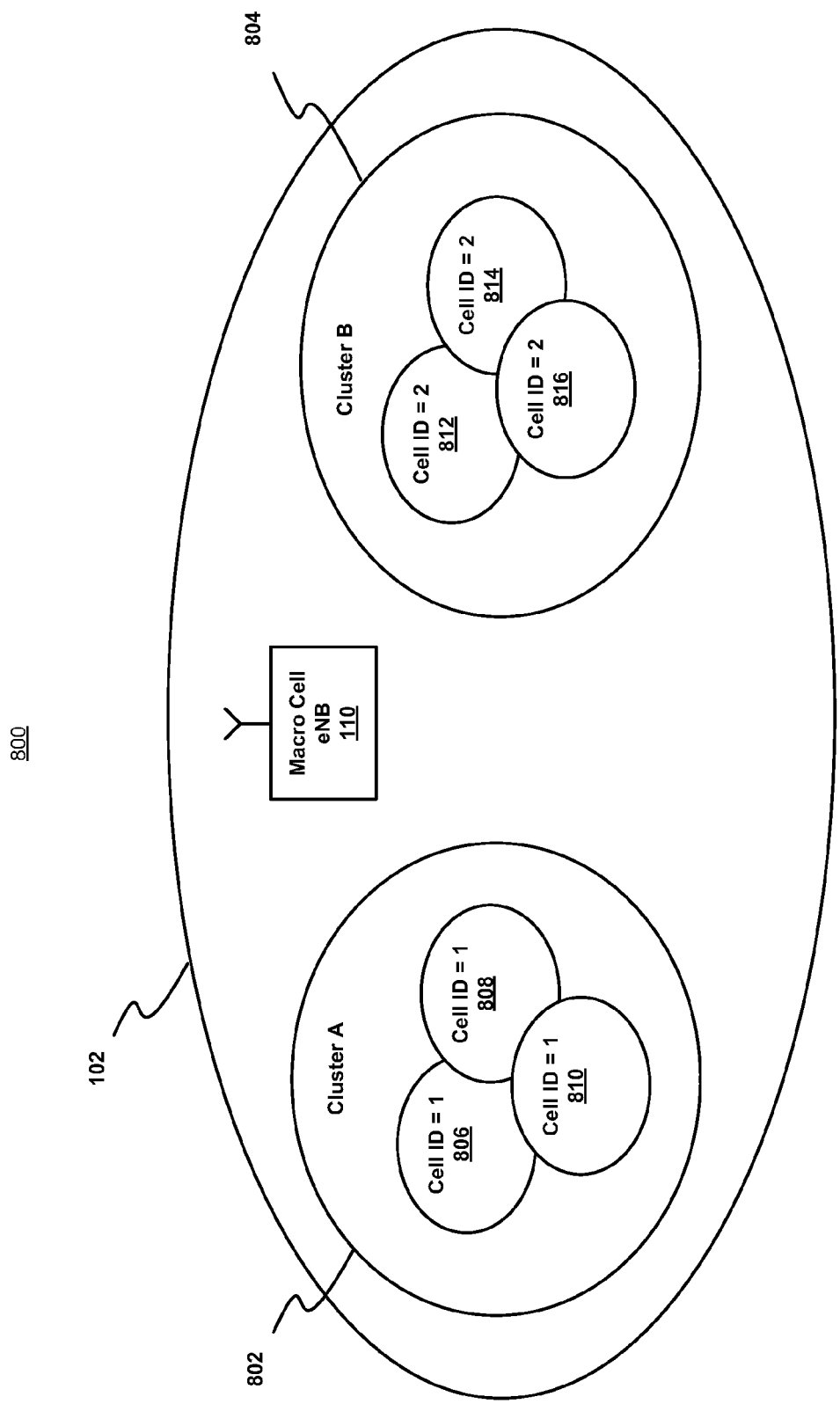
FIG. 8 illustrates a system diagram of another exemplary embodiment consistent with the present disclosure.

FIG. 8 illustrates a system diagram 800 of another exemplary embodiment consistent with the present disclosure. In a heterogeneous wireless network 100, many small cells 806, 808, 810 may be located within a common geographic area, for example an indoor environment, such as cluster A 802. These small cells may be configured with a common Cell ID, in this case Cell ID=1. Also shown is a second cluster, cluster B 804 which includes small cells 812, 814, 816 that all share a common Cell ID=2.

In this case, the same CRS may be transmitted in all of the small cells within the small cell cluster. Because the small cells have the same cell ID, the same Primary Synchronization Signal (PSS), Secondary Synchronization Signal (SSS) and/or CRS may be transmitted from multiple cells in the same cluster. The UE performs signal measurement based on the CRS which are used for mobility and/or proximity indication as previously described. In some embodiments, in order to relax inter-frequency cell detection complexity, the CRS may be transmitted at a lower density compared to the existing LTE CRS transmission density. For example, the CRS may be transmitted once per 5 ms or 10 ms interval. To take advantage of this coarser periodicity, the eNB may provide information for the UE to identify the subframe in which the CRS is transmitted, enabling the UE to use a measurement gap length less than the existing 6 ms LTE measurement gap length. This improves efficiency since the UE receiver is being burdened with the measurement function for a shorter period of time.

Figure 9:
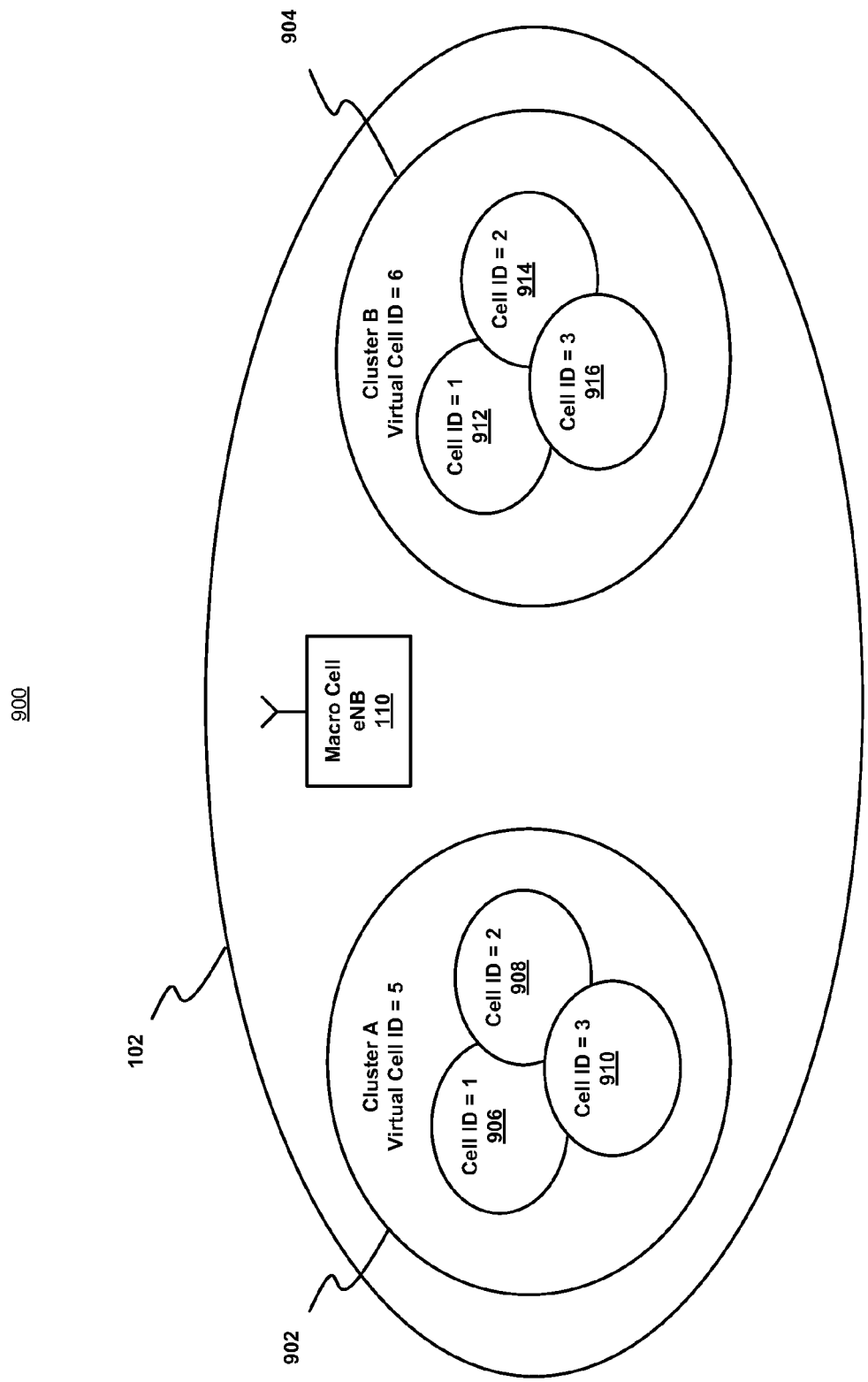
FIG. 9 illustrates a system diagram of another exemplary embodiment consistent with the present disclosure.

FIG. 9 illustrates a system diagram 900 of another exemplary embodiment consistent with the present disclosure. In this example of a heterogeneous wireless network 100, the small cells in each cluster have unique Cell IDs but those Cell IDs are duplicated in other clusters. For example, cluster A 902 has small cells 906, 908, 910 with Cell IDs 1, 2, and 3 while cluster B has small cells 912, 914, 916 also with Cell IDs 1, 2, 3. This approach can be useful to avoid a shortage of physical layer cell IDs and, if the cluster identity is provided, the collision or ambiguity of cell IDs between clusters may be resolved. This deployment may also be beneficial to increase cell split gain, however, it may cause an increase in handovers between cells. Additionally, the number of small cells that the UE needs to detect is different from the previous scenario described in connection with FIG. 8 above. To address this issue, some embodiments may employ a common discovery signal that can be transmitted from multiple small cells within a cluster. The UE may be configured to perform an initial signal measurement based on the discovery signal. When the discovery signal is detected and reported to the eNB, the eNB can configure each cell with a unique virtual Cell ID. The common discovery signal may be a PSS, SSS or CRS which is generated with the virtual Cell ID which becomes the cluster ID. Each cell may also transmit a cell specific CRS or Channel State Information Reference Signal (CSI-RS) for the cell specific measurement.

In some network configurations, for example to increase capacity, small cells may be deployed at different frequencies from the macro cell. In this case, the UEs need to perform inter-frequency measurements to detect these small cells. Many UEs, to reduce cost, lack dual channel receivers that would enable the detection of two different frequency channels simultaneously. These UEs instead use the measurement gaps to temporarily switch frequencies for this purpose, with the guarantee that the serving cell will not transmit to the UE during the measurement gap when the information would be lost to the UE. The use of measurement gaps for inter-frequency measurement, however, results in increased UE power consumption and interruption time which reduces UE throughput. As an alternative, some small cell eNBs may have dual RF receivers that can detect both small cell carrier frequencies and the macro cell UE uplink signal. To support this operation, the macro cell may need to transmit cell specific Sounding Reference Signal (SRS) configuration information and UE-specific SRS configuration information for the UEs served by the macro cell. Alternatively, the small cell may perform blind detection based on just the cell specific SRS configuration. When the small cell detects the SRS preamble, the small cell can send the measurement report to the macro cell.

Information that may be transmitted in the measurement report includes the detected UE identity and the received Signal to Noise Ratio (SNR) of the SRS. If the small cell is not provided the UE-specific SRS configuration, the small cell can send the detected SRS sequence and the detected subframe as an alternative to the UE identity.

Figure 10:
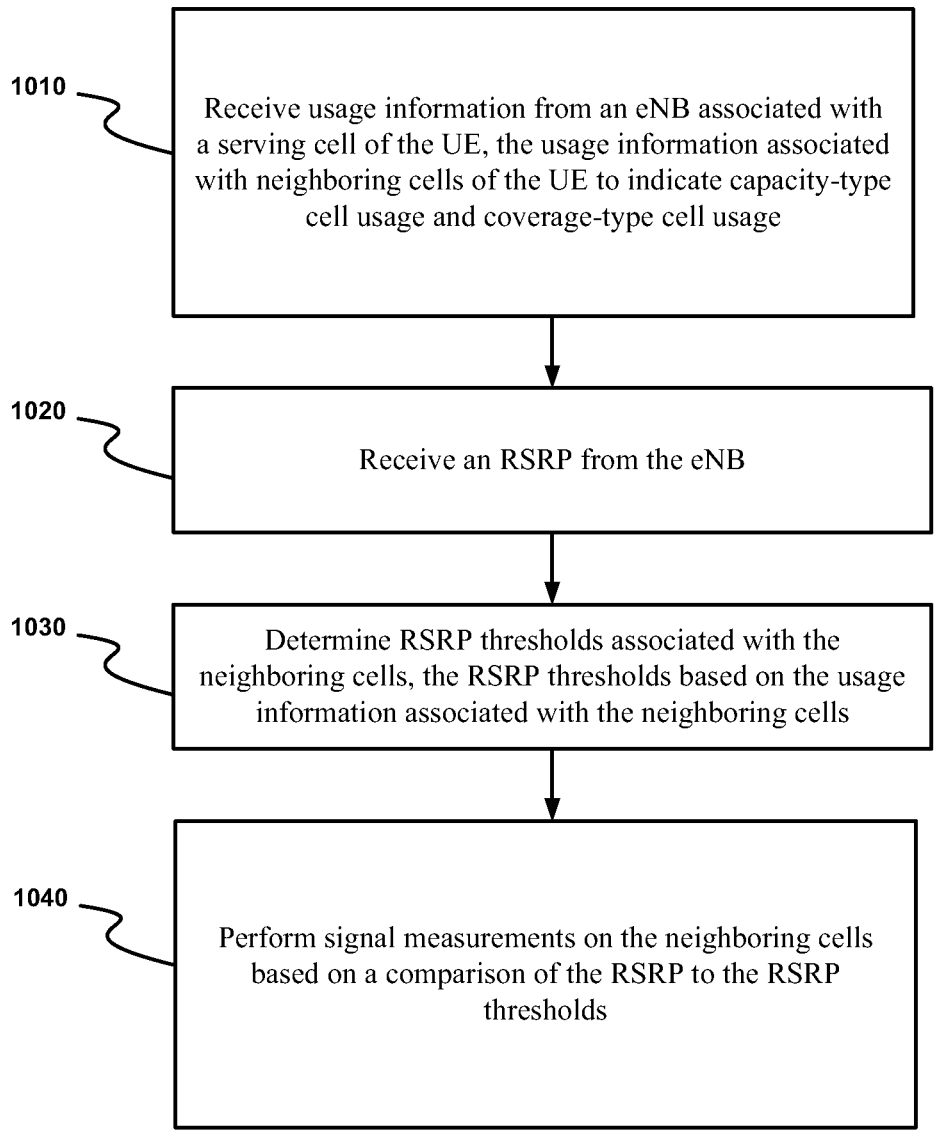
FIG. 10 illustrates a flowchart of operations of an exemplary embodiment consistent with the present disclosure.

FIG. 10 illustrates a flowchart of operations 1000 of an exemplary embodiment consistent with the present disclosure. At operation 1010, usage information is received from an eNB associated with a serving cell of the UE. The usage information is associated with neighboring cells of the UE and indicates whether the neighboring cells are capacity-type cells or coverage-type cells. At operation 1020, an RSRP is received from the eNB. At operation 1030, RSRP thresholds associated with the neighboring cells are determined. The RSRP thresholds are based on the usage information associated with the neighboring cells. At operation 1040, signal measurements are performed on the neighboring cells based on a comparison of the RSRP to the RSRP thresholds.

Figure 11:
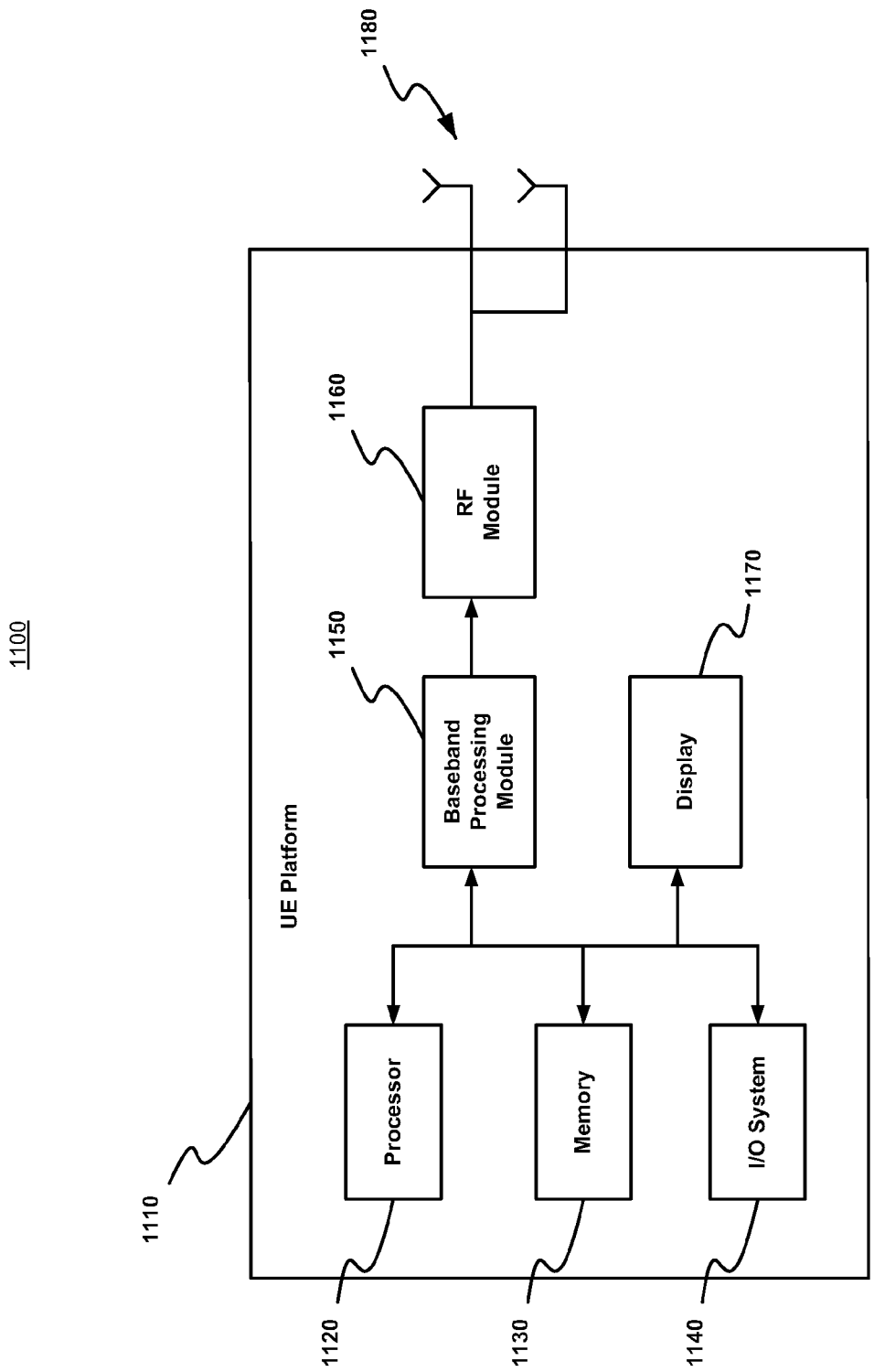
FIG. 11 illustrates a platform of one exemplary embodiment consistent with the present disclosure.

FIG. 11 illustrates a platform configuration 1100 of one exemplary embodiment consistent with the present disclosure. The platform 1110 may be a mobile communication device, such as, for example, a UE device (smartphone), a tablet, a laptop computing device or any other device configured to transmit or receive wireless signals. In some embodiments, platform 1110 may comprise a processor 1120, memory 1130, an input/output (I/O) system 1140, a display/keyboard or other type of user interface (UI) 1170 such as, for example, a touchscreen. Platform 1110 may further comprise a baseband processing module 1150 and an RF processing module 1160 as well as one or more antennas 1180 which may form part of a Multiple Input Multiple Output (MIMO) antenna system. Any number of platforms 1100 may transmit or receive signals through RF module 1160 and antennas 1180 over a wireless network which may be an LTE or LTE-A wireless network.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides apparatus and methods for improved UE mobility in wireless heterogeneous networks.

According to one aspect there is provided a UE. The UE may include a location determination module configured to determine location information associated with the UE relative to one or more of a plurality of cells, and the plurality of cells form part of a wireless heterogeneous network. The UE of this example may also include a processing circuit configured to generate an assistance message, the assistance message including the location information associated with said UE. The UE of this example may further include a transmitter circuit configured to transmit an RRC message to an eNB associated with one of the plurality of cells, the RRC message including the assistance message.

Another example UE includes the forgoing components and the location determination module is further configured to determine location of the UE based on a received signal selected from the group consisting of a GPS signal, a received Cell ID and a received WiFi SSID.

Another example UE includes the forgoing components and the location information further includes an indication of motion of the UE from a first cell of the plurality of cells towards a second cell of the plurality of cells.

Another example UE includes the forgoing components and the assistance message further includes a preferred cell carrier frequency.

Another example UE includes the forgoing components and the assistance message further includes a preferred PCI.

Another example UE includes the forgoing components and further includes memory coupled to the processing circuit, an I/O system coupled to the processing circuit, and a touchscreen display coupled to the I/O system.

According to another aspect there is provided a UE. The UE may include a receiver circuit configured to receive a list of neighbor cells relative to the UE, the NCL received from a serving eNB, the serving eNB serving the UE. The UE of this example may also include a processing circuit configured to extract usage information from the NCL, the usage information associated with the neighbor cells of the NCL, the usage information including a capacity-type cell usage indicator and a coverage-type cell usage indicator. The UE of this example may further include a signal measurement circuit configured to perform neighbor cell signal measurements based on the usage information associated with the neighbor cells.

Another example UE includes the forgoing components and the signal measurement circuit is further configured to perform the neighbor cell signal measurements in response to an RSRP of the serving eNB falling below a threshold, the threshold based on the usage information associated with the neighbor cells.

Another example UE includes the forgoing components and further includes a transmitter circuit configured to report the neighbor cell signal measurements to the serving eNB within a time period after a measurement reporting event occurs, the time period based on the usage information associated with the neighbor cells.

Another example UE includes the forgoing components and the NCL is included in a MeasObjectEutra information element of an RRC message received from the serving eNB.

Another example UE includes the forgoing components and the NCL is included in a System Information Block received from the serving eNB.

According to another aspect there is provided a UE. The UE may include a receiver circuit configured to receive data from a serving eNB, the serving eNB serving the UE, the data identifying a subframe associated with a CRS transmitted from a first neighbor cell. The receiver of this example may further be configured to receive the CRS from the first neighbor cell, where the CRS includes a first Cell ID and one or more other neighbor cells transmit a CRS including a second Cell ID, the second Cell ID equal to the first Cell ID. The UE of this example may also include a signal measurement circuit configured to perform a signal measurement on the identified subframe associated with the CRS transmitted from the first neighbor cell.

Another example UE includes the forgoing components and the CRS is transmitted with a period in the approximate range of 5 milliseconds to 10 milliseconds.

Another example UE includes the forgoing components and the signal measurement circuit is further configured to perform a signal measurement based on a discovery signal transmitted from a cell, the discovery signal selected from the group consisting of a PSS, an SSS and a CRS.

Another example UE includes the forgoing components and the discovery signal includes a virtual Cell ID, the virtual Cell ID associated with a cluster of neighbor cells.

Another example UE includes the forgoing components and the signal measurement circuit is further configured to perform a signal measurement based on a CSI-RS transmitted from a cell.

According to another aspect there is provided an eNB transceiver. The eNB may include a processing circuit configured to maintain an NCL, the NCL including usage information associated with the neighboring cells, the usage information indicating capacity-type cell usage and coverage-type cell usage. The eNB of this example may also include a transmitter circuit configured to transmit the NCL to one or more UEs in a serving cell associated with the eNB, the usage information determining timing of cell signal measurement reports generated by the UEs. The transmitter circuit of this example may further be configured to transmit CRS subframe identification to the UEs, the UEs configured to perform signal measurement on the CRS subframe.

Another example eNB includes the forgoing components and a plurality of cells transmit a CRS including a common Cell ID.

Another example eNB includes the forgoing components and further includes a dual receiver circuit configured to measure a first frequency carrier associated with a neighbor small cell and a second frequency carrier associated with a neighbor macro cell.

Another example eNB includes the forgoing components and the transmitter circuit is further configured to transmit an SRS and a UE Specific SRS.

According to another aspect there is provided a method. The method may include receiving, from an eNB associated with a serving cell of the UE, usage information associated with neighboring cells of the UE, the usage information indicating capacity-type cell usage and coverage-type cell usage. The method of this example may also include receiving an RSRP from the eNB. The method of this example may further include determining RSRP thresholds associated with the neighboring cells, the RSRP thresholds based on the usage information associated with the neighboring cells. The method of this example may further include performing signal measurements on the neighboring cells based on a comparison of the RSRP to the RSRP thresholds.

Another example method includes the forgoing operations and further includes reporting the neighbor cell signal measurements to the serving cell within a time period after a measurement reporting event occurs, the time period based on the usage information associated with the neighboring cell.

Another example method includes the forgoing operations and further includes determining motion of the UE relative to a cell, the motion including exit of the UE from a first cell and entrance of the UE to a second cell; and transmitting an RRC message from the UE to an eNB, the RRC message including the motion determination.

Another example method includes the forgoing operations and the motion determination is based on a received GPS signal, a received Cell ID and/or a received WiFi SSID.

Another example method includes the forgoing operations and further includes receiving data from the eNB identifying a subframe of a CRS, wherein a plurality of cells transmit a CRS including a common Cell ID; and performing a signal measurement on the subframe of the CRS.

Another example method includes the forgoing operations and further includes performing a signal measurement based on a discovery signal transmitted from a cell, the discovery signal including a PSS, an SSS and/or a CRS.

According to another aspect there is provided a computer-readable storage medium having instructions stored thereon which when executed by a processor result in the operations for improving UE mobility in a heterogeneous network previously described.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. User Equipment (UE) comprising:
   a location determination module configured to determine location information associated with said UE relative to one or more of a plurality of cells, wherein said plurality of cells form part of a wireless heterogeneous network;
   a processing circuit configured to generate an assistance message, said assistance message comprising said location information associated with said UE; and
   a transmitter circuit configured to transmit a Radio Resource Control (RRC) message to an evolved Node B (eNB) associated with one of said plurality of cells, said RRC message comprising said assistance message.

2. The UE of claim 1, wherein said location determination module is further configured to determine location of said UE based on a received signal selected from the group consisting of a GPS signal, a received Cell ID and a received WiFi SSID.

3. The UE of claim 1, wherein said location information further comprises an indication of motion of said UE from a first cell of said plurality of cells towards a second cell of said plurality of cells.

4. The UE of claim 1, wherein said assistance message further comprises a preferred cell carrier frequency.

5. The UE of claim 1, wherein said assistance message further comprises a preferred Physical Cell Identity (PCI).

6. The UE of claim 1, further comprising memory coupled to said processing circuit, an input/output (I/O) system coupled to said processing circuit, and a touchscreen display coupled to said I/O system.

* * * * *